United States Patent Office 3,114,606
Patented Dec. 17, 1963

3,114,606
STABILIZATION OF HYDROGEN PEROXIDE
Robert E. Meeker, Berkeley, Calif., assignor to Shell Oil Company, New York, N.Y., a corporation of Delaware
No Drawing. Filed Mar. 30, 1960, Ser. No. 18,486
9 Claims. (Cl. 23—207.5)

This invention relates to the stabilization of hydrogen peroxide against decomposition and deals particularly with the provision of an improved stannate stabilizer for this purpose and with a more economical and efficient method for carrying out the stabilization on a commercial scale.

Stannate type stabilizers, especially the alkali metal stannates, particularly sodium stannate, have been recognized as very effective inhibitors of the catalytic decomposition to which hydrogen peroxide is subject as a result the presence of small amounts of impurities, especially heavy metal ions. Liebknecht-Schaidhauf Patent U.S. 1,213,921 recommended the use of precipitated stannic acid for the stabilization but as pointed out in Reichert, U.S. 1,958,204, it is usually more advantageous to use a soluble stannate. The best results are described as being obtained when the peroxide is maintained acidic. However, the soluble stannates have serious disadvantages under the conditions of use heretofore employed. The non-turbid solutions of stannate in peroxide have poor stability and the stannates are coagulated by positive ions, the coagulated form being ineffective as a stabilizer. Roth patent, U.S. 2,872,293, attributes the difficulties in stabilizing hydrogen peroxide with stannate to the use of water as the solvent medium for the stannate and proposes solution of the stannate in concentrated hydrogen peroxide acidified to pH 5 before addition to the peroxide to be stabilized. Baker patent, U.S. 2,904,517, on the other hand, suggests dissolving sodium stannate in water together with sodium pyrophosphate and ammonium nitrate and adjusting the pH to an alkaline pH less than 9 to avoid formation of permanent precipitates before using the mixture for hydrogen peroxide stabilization. All of these methods of operation require separate adjustment of the pH of the peroxide after addition of the stannate. This is expensive because precise control of addition of small amounts of acid and base to large volumes of peroxide is difficult. Alternate additions of acid and base must be thoroughly distributed in the entire peroxide solution by vigorous stirring or the like until the exact required pH is obtained in the solution. This is a time consuming operation requiring personnel of high skill.

An important object of the present invention is to provide a stock solution of stannate stabilizer which can be admixed simply and inexpensively with a large volume of hydrogen peroxide to provide both the correct amount of stabilizer and the correct acidic pH for optimum stabilization in one operation without need for careful adjustment and trimming of the pH of the entire peroxide solution. A special object of the invention is the provision of a solution of sodium stannate which is an especially active stabilizer for hydrogen peroxide and maintains its effectiveness over long periods of time even at elevated temperatures. Still other objects and advantages of the invention will be apparent from the following description in which certain of its modifications will be emphasized but without any intent of limiting the invention thereto.

In accordance with the invention, hydrogen peroxide is stabilized by adding thereto an aqueous solution of a complex of a soluble stannate and a complexing agent for tin in which the concentration of stannate, calculated as $Na_2Sn(OH)_6$, is about 0.05% to about 10% by weight and the mole ratio of complexing agent to tin is between about 0.5:1 and about 20:1, the solution of the complex having been acidified to a pH below 5, preferably to about pH 1 to 4. Sufficient of this stock solution of acidic complex stannate is added to the hydrogen peroxide to introduce about 0.5 to about 200 milligrams of stannate, again calculated as $Na_2Sn(OH)_6$, per liter of peroxide solution and to make the aqueous equivalent pH of the mixture about 1 to about 5. By this method of operation the stock solution not only supplies the required amount of stabilizer but also imparts to the peroxide any desired specific pH, preferably one between about 1 and about 5 at which the stabilizer mixture is most effective. This is accomplished by simple mixing of the acidified stannate complex and peroxide solutions without need for pH adjustment on the peroxide.

In preparing the stock solutions of acidic complexed stannate, one can use any of the soluble stannate stabilizers of hydrogen peroxide. Ammonium stannate, the alkali metal stannates and the soluble alkaline earth metal stannates are all useful. Sodium, potassium and magnesium stannates are examples of useful stabilizers which can be employed.

It is essential that a complexing agent for tin be used in the indicated proportions with the chosen stannate or mixture of stannates in preparing the stock solution of stabilizer for use in accordance with the invention. Only in this way can the required acidification of the stannate solution to below pH 6 be carried out without massive irreversible precipitation resulting in stannate which is a relatively poor stabilizer for hydrogen peroxide. This undesirable form of stannate precipitate does not readily redissolve when the stock solution is added to the peroxide. It is to be avoided in preparing the stock solutions of the invention which may, however, contain reversible precipitates of stannate which redissolve on addition of the stock solution to the peroxide being stabilized. Another advantage of the stock solutions of the invention is that because of complex formation the stannate and complexing agent are more soluble, jointly than separately so more concentrated solutions can be used without danger of difficulties from undissolved solids.

A variety of soluble complexing agents for tin can be used in preparing the stock solutions of stannate stabilizers of the invention. Both organic and inorganic complexing agents for tin which are stable to hydrogen peroxide can be successfully used. A number of these complexing agents have a stabilizing effect of their own on hydrogen peroxide and thus offer special advantage over other types of tin complexing agents which are not so effective in this respect although they may be just as useful in achieving the complexing of the stannate required for the stock solutions of the invention.

Among the useful organic complexing agents for tin are, for example, the chelating agents such as the amino carboxyl compounds, for instance, those containing at least one N,N-dicarboxyalkylamino group,

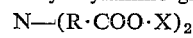
$$N—(R \cdot COO \cdot X)_2$$

wherein R is an alkylene radical of up to two carbon atoms and X is hydrogen or a salt-forming cation such, for instance, as an alkali metal or alkaline earth metal or ammonium ion, the two indicated X's being the same or different. U.S. Patent 2,371,623 describes a number of polycarboxy amines of this kind such as nitrilotriacetic acid, aminoethyl-N,N-diacetic acid, ethylenediamine-N,N,N'N'-tetraacetic acid, etc., which can be successfully used in the stock solutions of the invention. Especially advantageous are those polycarboxy amines which contain a plurality of N,N-dicarboxyalkylamino groups in the molecule, especially those having at least two adjacent carbon atoms to each of which is directly attached at least one of said N,N-dicarboxyalkylamino group. In copending application of Robert E. Meeker, Serial No.

777,209, filed December 1, 1958, there is described a particularly suitable sub-group of polycarboxyamines of this preferred type, namely, the water-soluble N,N-(dicarboxyalkyl)amino-substituted carbocyclic compounds having a saturated carbocyclic ring with at least two adjacent ring carbon atoms each directly linked to the nitrogen atom of an N,N-di(carboxyalkyl) amino group containing up to two carbon atoms in each of said alkyl radicals. Examples of chelating agents for tin of this type which are described are the water-soluble 1,2-diaminocycloalkane-N,N,N',N'-tetraacetic acids and their salts having 5 to 18 carbon atoms in the cycloalkane radical, such as 1,2-diaminocyclopentane-N,N,N',N'-tetraacetic acid, disodium 1,2-diaminocyclohexane-N,N,N',N'-tetraacetic acid, tetra-potassium 1,2-diaminoperhydronaphthalene-N,N,N',N'-tetraacetic acid, tri-ammonium 4,7-diisobutyl - 1,2-diaminoperhydronaphthalene-N,N,N',N'-tetraacetic acid and the like.

Another type of chelating agent for tin which is useful in preparing the soluble stannate polymers used in the invention are the pyridine carboxylic acids such as quinolinic acid, pyridinedicarboxylic acids, etc., described in U.S. Patent 2,624,655 as being useful for hydrogen peroxide stabilization but which are made more effective when used with a partial polymer of sodium stannate according to the process of the present invention.

As inorganic complexing or chelating agents for tin which can be used in the new method of peroxide stabilization are included soluble phosphate compounds such as the ortho-and/or meta-phosphates, as well as the polyphosphates of which the pyrophosphates, the polymetaphosphates, particularly the hexametaphosphates, the tripolyphosphates and the tetraphosphates, for instance, are especially advantageous. The soluble phosphates are preferably added in the form of their salts, the alkali metal salts, especially the sodium and potassium salts, being particularly useful because of their availability and low cost, although ammonium or other soluble salts can be employed, as can the corresponding free acids. Salts corresponding to complete or partial neutralization of the acid, for instance, primary salts such as $Na_2HPO_4$ or tertiary salts such as $Na_3PO_4$ can be used in making the compositions of the invention. Instead of inorganic salts one can use amine salts or phosphate esters of any of the previously indicated phosphorus-containing acids although as a general rule these are more expensive and so are less desirable.

The stock solution can be made up in various ways. One convenient method is to dissolve the chosen stannate in water or aqueous hydrogen peroxide solution then add the required amount of complexing agent for tin or mixture of such complexing agents and finally acidifying to bring the pH to a value below about 5 which will provide an aqueous equivalent pH of about 0 to 5, preferably between about 1 and 4, when the stock solution is added to the hydrogen peroxide which is to be stabilized. The aqueous equivalent pH of the peroxide solution here referred to is that determined by direct pH meter reading corrected for peroxide concentration effects as described by J. R. Kolczynski et al. in the Journal of the American Chemical Society, vol. 79, page 531 (1957). The reverse order of addition of the stannate and complexing agent can also be used and one may employ an aqueous hydrogen peroxide solution instead of water for preparing the stock solution. For the final adjustment of the pH of the stock solution, any suitable acid can be used. For instance, nitric, phosphoric or sulfuric acid or an organic acid such as citric, lactic, gluconic, malic or like acid can be used. Other stabilizers of hydrogen peroxide may be included in the stock solution where needed for special purposes but are usually unnecessary and are not preferred. Ordinary or elevated temperatures up to the boiling point of the solution can be used to promote more rapid solution of the components of the stock solution. Any solid which remains after the stock solution has cooled and stood for several days is preferably removed by filtration. This removal is not essential, however, since such solid is easily suspended by stirring and does not interfere with accurate mixing of the solution with the hydrogen peroxide to be stabilized.

An especially advantageous modification of the invention makes use of stannate which has been subjected to controlled polymerization before being treated with the complexing agent for tin. The effectiveness of the stannate is greatly increased by this polymerization to a polymeric form which remains water soluble. This highly effective polymeric form is only transitory, however, since the stannate will continue to polymerize under normal conditions of storage of its solutions both in water and in the hydrogen peroxide being stabilized. As a result of this continued polymerization, the stannate becomes converted to forms which are easily precipitated, and which are relatively ineffective as a peroxide stabilizer.

The discovery has been made that by proper control, the polymerization of sodium stannate can be regulated so that the desired highly active form is produced and further polymerization is then prevented. This has been achieved by adding to the stannate polymerized to the soluble polymer stage a complexing agent for tin of the types previously described. By complexing or chelating the terminal and other tin ions of the soluble polymer, the complexing agent terminates the growth of stannate polymers, preventing the excessive polymerization and cross-linking which can lead to forms of stannate which are less desirable for peroxide stabilization and may even be insoluble therein.

Different methods can be used to bring about the limited polymerizaiton of stannate which makes it so much more effective as a stabilizer than the monomeric form which is obtained when sodium stannate, for instance, is first dissolved in either water or aqueous hydrogen peroxide solution. One can take advantage of the polymerization which occurs on the aging of these aqueous stannate solutions at ordinary temperatures. This is rather slow, however, several days being required for the stannate to reach its full effectiveness as a peroxide stabilizer. The time required for polymerization can be reduced by increasing the temperature of the solution. Thus one can advantageously heat an aqueous solution of sodium stannate at about 75° to about 150° C. to obtain a polymeric form having high stabilization efficiency in about 10 minutes to about 2 hours. Acidfication is another effective method for promoting rapid polymerization of the stannate to the desired soluble form having improved stabilization power. It is neither necessary, nor usually desirable, to carry the acidification to a pH below 7.0 in order to obtain the desired polymerization at a practical rate, indeed a pH between about 7 and about 8 is usually most advantageous, although one can acidify to a pH as low as about 6, if desired. Sulfuric, phosphoric, nitric or like acids are useful for acidification of the stannate solutions in promoting the polymerization.

Whichever method of stannate polymerization is chosen, it is advantageous to use a stannate solution of at least about 0.05% wt. concentration since the polymerization becomes impractically slow if the concentration is greatly reduced below this value. Concentrations of stannate as high as 10% can be used although there will generally be some excessive polymerization and formation of insoluble salts in such cases. Such insoluble inactive stannate is preferably removed by filtration before using the activated soluble stannate in the process of the invention.

As previously indicated, it is essential, in order to obtain the advantages of the new process, that a water-soluble complexing agent for tin be added to the partly polymerized soluble stannate solution in order to arrest further polymerization before the stannate is acidified to the low pH desired for use in hydrogen peroxide stabilization according to the invention. While any of the previously described or similar complexing agents for tin can be used, there are special advantages in using for preparation of the stock solution a complexing agent which will also chelate aluminum and thus be effective not only in controlling the degree of stannate polymerization as described above but also in protecting the stannate from the deactivation or precipitation which is brought about by traces of aluminum ions which result from the corrosion of drums or other containers made of metallic aluminum with which the hydrogen peroxide being stabilized comes in contact. The phosphates have this desirable combination of properties. Because of complex formation, sodium pyrophosphate and sodium stannate are more soluble jointly than separately so more concentrated stock solutions can be used without danger of difficulties from undissolved solids.

The invention is further illustrated by the following examples in which some of its advantages over other methods of hydrogen peroxide stabilization are shown.

EXAMPLE I

The effectiveness of the stock solutions of the invention even after aging is shown by the following results of tests on the stabilization of 35% weight hydrogen peroxide containing as impurities 0.1 milligram iron and 0.02 milligram of copper per liter. The stock solutions were prepared by subjecting an aqueous solution containing 0.1% weight sodium stannate to aging for more than five days to polymerize the stannate to a soluble active form. The tin complexing agents, 1,2-diaminocyclohexane-N,N,N',N'-tetraacetic acid and sodium pyrophosphate $$(Na_4P_2O_7)$$

were then dissolved in separate portions of the stannate solution in amounts of 0.5% and 1.1%, weight, respectively. In a third portion of the same stannate solution 0.5% of the 1,2-diaminocyclohexane-N,N,N',N'-tetraacetic acid and 1.1% weight, of sodium pyrophosphate were both dissolved. The pH of each of the solutions was then adjusted to 3.3 by adding nitric acid. Aliquots of these stock solutions were added to the 35% hydrogen peroxide in the proportion of about 1:100 so the concentrations of the additives were as shown in the following table. The hydrogen peroxide was then subjected to the standard stability test of heating at 100° C. and determining the peroxide loss in 24 hours. A similar test was made five days later with the same stabilizer stock solutions and the stability of the hydrogen peroxide without added stabilizer was also determined. The following results were obtained:

| Concentration in Hydrogen Peroxide (milligrams per liter) | | | Direct pH of the Hydrogen Peroxide Test Solution with no adjustment after addition of stock solution | | Hydrogen Peroxide Decomposition Rate at 100° C. (percent per 24 hours) | |
| --- | --- | --- | --- | --- | --- | --- |
| Sodium Stannate $Na_2Sn(OH)_6$ | 1,2-diamino-cyclo-hexane-N,N,N',N'-tetra-acetic acid | Sodium pyro-phos-phate $Na_4P_2O_7$ | At start of stability test | After stability test | Initial Test | With Stock solution 5 days older |
| 0 | 0 | 0 | 3.3 | 3.1 | 700 | ---- |
| 10 | 50 | 0 | 3.2 | 3.4 | 0.78 | ---- |
| 10 | 50 | 0 | 3.3 | 3.4 | ------ | 0.63 |
| 10 | 0 | 110 | 3.2 | 3.2 | 0.34 | ---- |
| 10 | 0 | 110 | 3.3 | 3.1 | ------ | 0.38 |
| 10 | 50 | 110 | 3.1 | 3.3 | 0.40 | ---- |
| 10 | 50 | 110 | 3.3 | 3.3 | ------ | 0.98 |

EXAMPLE II

This example illustrates the production of a stock solution of polymerized sodium stannate and its use for stabilizing hydrogen peroxide of different concentrations. The stock solution was made by suspending about 1% wt. $Na_2Sn(OH)_6$ in water and adding nitric acid to bring the pH to 7. After standing two hours the crystalline stannate was converted to much gelatinous precipitate. Solid sodium pyrophosphate decahydrate was added to give 11% wt. as anhydrous sodium pyrophosphate, the stannate then going into solution. The solution was heated to dissolve the pyrophosphate and then acidified with nitric acid to pH 3.3. The turbidity which developed on cooling was removed by again heating at 80° C. to obtain a solution from which only a minor amount of finely-divided solid separated after standing several days. A 0.1 ml. aliquot was added to 100 ml. of 35% wt. hydrogen peroxide containing 0.1 milligram of iron and 0.02 milligram of copper as impurities, the direct pH reading of the mixture was 3.4 and in a test of stabilization the loss of $H_2O_2$ in 24 hours at 100° C. was only 0.4%.

Hydrogen peroxide of 70% concentration is effectively stabilized with the same stock solution in 2.3 to 100 dilution giving 25 milligrams of sodium stannate and 250 milligrams of sodium pyrophosphate per liter of peroxide. With 90% hydrogen peroxide containing 0.1 milligram of iron and 0.02 milligram of copper per liter a stock solution similarly prepared but containing 25 milligrams of 1,2-diaminocyclohexane-N,N,N',N'-tetraacetic acid per liter as the chelating agent for tin gives good stabilization when used in proportions which provide 5 to 20 milligrams of sodium stannate per liter of final hydrogen peroxide solution.

Good stabilization is also obtained when 2,6-pyridine-dicarboxylic acid or sodium hexametaphosphate is used as the chelating agent when preparing the stock solution of polymerized sodium stannate in the same way.

EXAMPLE III

The importance of not combining the stannate with the chelating agent in stock solutions until after the stannate has been partially polymerzed is shown by the following results of tests carried out with stock solutions made by dissolving 0.1% wt. $Na_2Sn(OH)_6$ in water with and without chelating agent for tin, particularly 1.1% wt. $Na_4P_2O_7$, and then subjecting the solution to treatments effective for polymerization in the absence of the added chelating agent, after which the chelating agent was added to the solutions in which it was not already present and the pH was adjusted to about 3. Aliquots of the stock solutions were diluted 100-fold with the 35% wt. hydrogen peroxide of Example I and the resulting solutions containing 100 milligrams of $Na_2Sn(OH)_6$ and 110 milligrams of $Na_4P_2O_7$ per liter were tested for stability by heating at 100° C.

$H_2O_2$ *Decomposition Rate at 100° C., Percent Per 24 Hours*

| Method of Stannate Polymerization | Chelating Agent Present during Stannate Treatment | Chelating Agent added only after stannate treatment |
| --- | --- | --- |
| Aging 20 days | 40 | 0.8 |
| Acidifying to pH 5 | 12 | 0.6 |
| Heating 2 hours at 80° C. | 14 | 0.6 |

It will be seen that the process of the invention offers many advantages and is capable of various modifications. The invention will therefore be recognized as not limited to the procedures which have been described by way of illustration nor by any theory proposed in explanation of the improved results which are attained.

I claim as my invention:

1. In a process for stabilizing hydrogen peroxide by adding a water-soluble stannate of the group consisting of the alkali and alkaline earth metal and ammonium stannates in an amount equivalent to about 0.5 to about 200 milligrams of sodium stannate per liter of stabilized peroxide, the improvement which comprises, forming an aqueous solution of said stannate in which the concentration of stannate calculated as Na$_2$Sn(OH)$_6$ is about 0.05% to about 10% by weight,
    polymerizing said stannate to a soluble polymeric form in the substantial absence of chelating agent for tin,
adding to the aqueous solution of polymeric stannate a chelating agent for tin which is soluble in said solution and stable in the hydrogen peroxide being stabilized in a mole ratio of chelating agent to tin of about 0.5:1 to about 20:1,
    acidifying the solution of complexed polymeric stannate to an aqueous equivalent pH below 5,
using the resulting stable acidic solution of polymeric stannate to effect simultaneous stabilization and adjustment of the pH of the hydrogen peroxide to about 0 to 5.

2. A process in accordance with claim 1 wherein the polymerized stannate is complexed with a chelating agent for tin containing an N,N-dicarboxyalkylamino group in which the carboxyalkyl radicals have up to three carbon atoms each.

3. A process in accordance with claim 1 wherein the polymerized stannate is complexed with 2,6-pyridinedicarboxylic acid.

4. A process in accordance with claim 2 wherein the chelating agent is ethylenediamine-N,N,N',N'-tetraacetic acid.

5. In a process for stabilizing hydrogen peroxide by adding a water-soluble stannate of the group consisting of the alkali and alkaline earth metal and ammonium stannates in an amount equivalent to about 0.5 to about 200 milligrams of sodium stannate per liter of stabilized peroxide, the improvement which comprises,
    forming an aqueous solution containing said stannate as essentially the sole hydrogen peroxide stabilizer in which the concentration of stannate, calculated as Na$_2$Sn(OH)$_6$, is about 0.05% to about 10% by weight,
        polymerizing said stannate in the substantial absence of chelating agent for tin to a soluble polymeric form more effective for stabilizing hydrogen peroxide than the unpolymerized stannate,
    adding to the aqueous solution of polymerized stannate, a soluble inorganic polyphosphate salt chelating agent for tin which is stable in the hydrogen peroxide to be stabilized using a mole ratio of said polyphosphate chelating agent to tin of about 0.5:1 to about 20:1,
        acidifying the solution of complexed polymeric stannate to an aqueous equivalent pH below 5,
    using the resulting stable acidic solution of polymeric stannate to effect simultaneous stabilization and adjustment of the pH of the hydrogen peroxide to about 0 to 5.

6. A process in accordance with claim 1 wherein the polymerized stannate is complexed with sodium pyrophosphate.

7. In a process for stabilizing hydrogen peroxide by adding a water-soluble stannate of the group consisting of the alkali and alkaline earth metal and ammonium stannates in an amount equivalent to about 0.5 to about 200 milligrams of sodium stannate per liter of stabilized peroxide, the improvement which comprises,
    forming an aqueous solution containing said stannate as essentially the sole hydrogen peroxide stabilizer in which the concentration of stannate, calculated as as Na$_2$Sn(OH)$_6$ is about 0.05% to about 10% by weight,
        aging said aqueous stannate solution for at least 3 days at room temperature to effect polymerization of the stannate to a soluble form more effective for stabilizing hydrogen peroxide than unpolymerized stannate,
    adding to the aqueous solution of polymerized stannate, a chelating agent for tin which is soluble in said solution and stable in the hydrogen peroxide being stabilized in a mole ratio of chelating agent to tin of of about 0.5:1 to about 20:1,
        acidifying the solution of complexed polymeric stannate to an aqueous equivalent pH below 5,
    using the resulting stable acidic solution of polymeric stannate to effect simultaneous stabilization and adjustment of the pH of the hydrogen peroxide to about 0 to 5.

8. In a process for stabilizing hydrogen peroxide by adding a water-soluble stannate of the group consisting of the alkali and alkaline earth metal and ammonium stannates in an amount equivalent to about 0.5 to about 200 milligrams of sodium stannate per liter of stabilized peroxide, the improvement which comprises,
    forming an aqueous solution containing said stannate as essentially the sole hydrogen peroxide stabilizer in which the concentration of stannate, calculated as Na$_2$Sn(OH)$_6$ is about 0.05% to about 10% by weight,
        heating said aqueous stannate solution at about 70° to about 100° C. for about 10 minutes to 2 hours to effect polymerization of the stannate to a substantially soluble form effective for stabilizing hydrogen peroxide
    adding to the aqueous solution of polymerized stannate an organic chelating agent for tin which is soluble in said solution and stable in the hydrogen peroxide being stabilized in a mole ratio of chelating agent to tin of about 0.5:1 to about 20:1,
        acidifying the solution of complexed polymeric stannate to an aqueous equivalent pH below 5,
    using the resulting stable acidic solution of polymeric stannate to effect simultaneous stabilization and adjustment of the pH of the hydrogen peroxide to about 0 to 5.

9. A process in accordance with claim 8 wherein the chelating agent added to the aqueous solution of polymerized stannate is disodium 1,2-diaminocyclohexane-N,N,N',N'-tetraacetic acid.

References Cited in the file of this patent

UNITED STATES PATENTS

| | | |
|---|---|---|
| 1,958,204 | Reichert | May 8, 1934 |
| 2,497,814 | Elston | Feb. 14, 1950 |
| 2,872,293 | Roth | Feb. 3, 1959 |
| 2,904,517 | Baker | Sept. 15, 1959 |
| 2,950,175 | Johnston | Apr. 23, 1960 |
| 2,961,306 | Johnston | Nov. 22, 1960 |

FOREIGN PATENTS

| | | |
|---|---|---|
| 409,361 | Great Britain | Apr. 30, 1934 |

OTHER REFERENCES

Chabaret and Martell, Organic Sequestering Agents, John Wiley and Sons, New York, 1959, pp. 306–327, 564; page 397.